Feb. 19, 1952     J. G. BRADBURY     2,586,453

TAMPER-PROOF PLUG VALVE

Filed Jan. 29, 1948

INVENTOR.
James G. Bradbury
BY
Florian S. Miller
Atty.

Patented Feb. 19, 1952

2,586,453

UNITED STATES PATENT OFFICE 2,586,453

TAMPERPROOF PLUG VALVE

James G. Bradbury, Erie, Pa., assignor to Hays Manufacturing Company, Erie, Pa.

Application January 29, 1948, Serial No. 5,051

2 Claims. (Cl. 251—112)

This invention relates generally to plug valves and more particularly to tamper proof means in a plug valve to prevent unauthorized disconnection thereof.

Caps or covers have been utilized to cover the nut on the depending threaded portion of the stop plug in plug valves but it has been found that these caps are easily removed by unauthorized persons and the nut is turned. Many utility companies in the country have been and are being sued because stop plugs have been blown out after the shearing off of the lower end of the stop plug wherein gas passed from the gas line and fires, explosions and other damage resulted. The shearing of the lower end of the plug is usually caused when the plug freezes and in an attempt to free it the nut is rotated in the wrong direction or it is corroded. The threads are stripped in many cases. Furthermore, these prior plugs tend to freeze wherein rotation is almost impossible.

It is, accordingly, an object of my invention to overcome the above and other defects in present plug valves and it is more particularly an object of my invention to provide a plug valve which is tamper-proof, which is economical in cost, economical in construction, economical in manufacture, and efficient in operation.

Another object of my invention is to provide spring means in conjunction with a tapered plug in a plug valve which causes the plug to seat on its seat at all times and which minimizes the freezing of the plug on its seat.

Another object of my invention is to provide novel threaded means for connection to the threaded depending portion of a plug in a plug valve which cannot be engaged by any type of wrench.

Another object of my invention is to provide a plug valve wherein the threaded member connecting the plug cannot be rotated to cause accidents and explosions.

Another object of my invention is to provide a plug valve which cannot be disassembled except by the use of a drill.

Another object of my invention is to provide a spring urged plug which may be freed by tapping.

Another object of my invention is to provide a plug for a plug valve wherein the threaded end of the plug may be comparatively larger than has heretofore been provided.

Other objects of my invention will become evident from the following detailed description, taken in conjunction with the accompanying drawings, in which Fig. 1 is a side elevational view of my novel plug valve;

Figure 2:
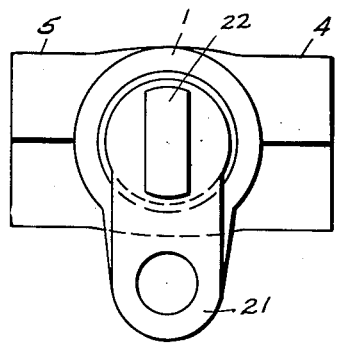
Fig. 2 is a plan view of my novel plug valve.
Figure 4:
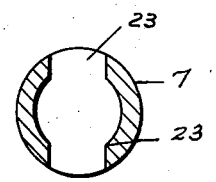
Fig. 4 is a view taken on the line 4—4 of Fig. 3 through the plug.
Figure 1:
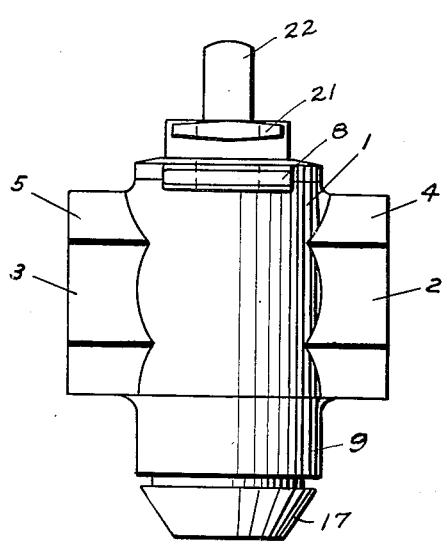
Figure 3:
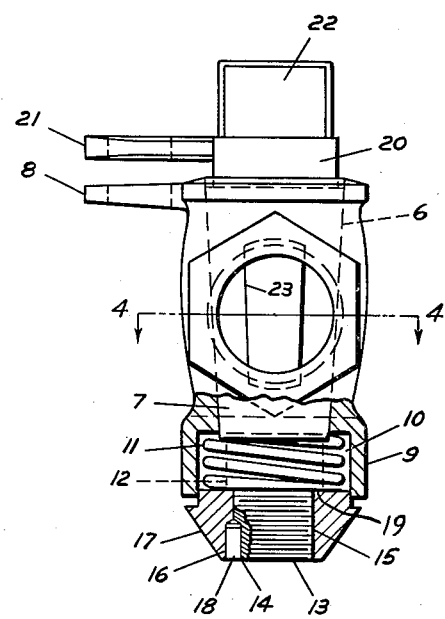
Fig. 3 is a side elevational view of my novel plug valve with the lower part thereof in section for better illustration.

Referring now to the drawings, I show in Figs. 1, 2, 3 and 4 a plug valve comprising a cylindrical body 1 having aligned apertures 2 and 3 extending laterally outwardly thereof in bossed portions 4 and 5 to provide an inlet and an outlet for the plug valve. The body 1 has a vertically extending, internal, tapered seat 6 for seating a stop plug 7. An outwardly extending, apertured, locking arm 8 is provided on the upper end of the body 1. A skirt 9 depends from the body 1 and it provides an open, cylindrically shaped nesting chamber 10 for a spring 11 which is disposed around the reduced portion 12 of the plug 7. The inner diameter of the spring 11 is large enough to permit free vertical movement of the portion of the plug 7 above the reduced portion 12. The plug 7 has a further reduced depending threaded portion 13 with a longitudinally extending, semi-circular shaped groove 14, for threadably engaging a threaded member 15 with a longitudinally extending semi-circular shaped groove 16 corresponding to the groove 14 in the threaded end 13 of the plug 7. The outer side 17 of the threaded member 15 is tapered so that it cannot be engaged by a pipe wrench or any other type of wrench. The semi-circular shaped grooves 14 and 16 provide a cylindrical aperture when aligned for receiving a pin 18 which locks the threaded member 15 and the threaded end 13 against relative rotation. The pin 18 has a diameter several thousandths of an inch greater than the diameter formed by the cylindrical grooves 14 and 16 thereby providing a press fit for the pin 18 when it is pressed or driven into the cylindrical portion formed by the grooves 14 and 16. The reduced portions 12 and 13 of the plug 7 form a shoulder 19. The upper end of the plug 7 has a reduced cylindrical portion 20 with a laterally outwardly extending apertured locking arm 21 corresponding to the locking arm 8 on the body 1. A key 22 of the flat type extends upwardly from the plug 7 for rotation thereof. The plug 7 has a centrally disposed, longitudinally extending aperture 23 centrally thereof adapted to align with the inlet and outlet apertures 2 and 3 to permit the flow of fluid through the body 1 when the plug 7 is in a rotational position as shown in Fig. 3.

In the assembly of my novel plug valve, it is merely necessary to dispose the plug 7 on the seat 6 of the body 1 as shown particularly in Fig. 3, place the spring 12 around the reduced portion 12 of the plug 7, and threadably engage the threaded member 15 with the threaded end 13 of the plug 7 until the threaded member 15 engages the shoulder 19 formed between the reduced portion 12 and the threaded end 13 of the plug 7. By providing the shoulder 19, the threaded member 15 is locked thereagainst and alignment of the grooves 14 and 16 is simplified. The semi-circular shaped grooves 14 and 16 in the threaded end 13 and threaded member 15 respectively are aligned and the pin 18 is forced therein by a suitable press or driving hammer. The plug 7 may then be rotated by the key 22 to an open position with the aperture 23 in the plug 7 aligned with the inlet and outlet apertures 2 and 3 or in a closed position at right angles to its position as shown in Fig. 3. Furthermore, the apertured locking arms 8 and 21 may be aligned and locked by any suitable well known means.

The spring 11 is of sufficient strength to maintain the plug 7 on its seat 6 in the body 1 while still permitting free rotation thereof by means of the key 22 without exerting too great a force. It will be noted that the spring 11 is enclosed and protected. It will further be noted that the threadable member 15 cannot be engaged by any form of wrench and it is necessary to remove the pin 18 by drilling if the threaded member 15 is to be removed from the plug 7. It will thus be seen that the average user will not be able to remove the threaded member 15 thereby preventing the breaking off of the threaded end 13 of the plug 7 and the blowing out of the plug 7 to cause fires and explosions as has resulted with the use of prior stop cocks in gas lines. The outer side 17 of the threaded member 15 may be arcuate in shape without departing from my invention. The outer side of the threaded member 15 is in alignment with the outer side of the skirt 9 thereby providing a continuing contour so that there are no extending surfaces to permit removal of the threaded member 15 by a wedging instrument or hammer. The stop plug 7 may be unfrozen by tapping the end 13 thereof wherein the spring 11 returns it to its seat.

It will be evident that other means than the pin 18 may be provided for locking the threaded member 15 on the threaded end 13 of the cock 7 without departing from my invention.

From the foregoing, it will be seen that I have provided a tamper-proof plug valve which prevents removal of the plug, which prevents rotation of the threaded member connecting the threaded end of the plug and any resultant shearing of the end of the plug and which has spring means and other structural elements which provide an efficient and durable plug valve with long life and one which requires few replacements and repairs.

Various changes may be made in the specific embodiment of my invention without departing from the spirit thereof or from the scope of the appended claims.

What I claim is:

1. A plug valve comprising a body having a tapered seat and an inlet and an outlet and a depending skirt, a rotatable tapered plug disposed on said seat having an apertured portion for registration with said inlet and said outlet and having a reduced threaded end with a longitudinally extending groove on the peripheral surface thereof, said threaded end defining a shoulder spaced a predetermined distance from the end thereof, an inverted, conical shaped threaded member for threadably engaging the threaded end of said plug and said shoulder and having the lateral outer side thereof tapered and coincidental with a contour line embodying the outer side of said body, a portion of said threaded member being telescopically disposed in said skirt and being relatively movable thereto a predetermined distance, said threaded member having a longitudinally extending, semi-circular shaped internal groove for registration with the groove on the end of said plug, a pin disposed in said registered grooves engaging said threaded end of said plug and said threaded member, and a coil spring surrounding said plug within said skirt and engaging said threaded member for urging said plug on its seat.

2. A plug valve as set forth in claim 1 wherein the end of said tapered threaded member has a shoulder normal to the axis of said tapered threaded member and spaced a predetermined distance from the end of said skirt whereby said threaded member is movable a predetermined distance relative to said skirt longitudinally.

JAMES G. BRADBURY.

REFERENCES CITED

The following references are of record in the file of this patent:

UNITED STATES PATENTS

| Number | Name | Date |
|---|---|---|
| 288,781 | Duerstock | Nov. 20, 1883 |
| 333,030 | Steen | Dec. 22, 1885 |
| 564,289 | Maloney | July 21, 1896 |
| 929,084 | George | July 27, 1909 |
| 1,038,308 | Deckebach | Sept. 10, 1912 |
| 2,024,901 | Wrigley | Dec. 17, 1935 |

FOREIGN PATENTS

| Number | Country | Date |
|---|---|---|
| 20,320 | Great Britain | of 1912 |